United States Patent
Watkins

(10) Patent No.: US 7,394,968 B2
(45) Date of Patent: Jul. 1, 2008

(54) ENHANCED PERSONAL VIDEO RECORDER INCLUDING USER PLAY PROGRAMMING

(75) Inventor: Daniel Watkins, Saratoga, CA (US)

(73) Assignee: LSI Corporation, Milpitas, CA (US)

( * ) Notice: Subject to any disclaimer, the term of this patent is extended or adjusted under 35 U.S.C. 154(b) by 1038 days.

(21) Appl. No.: 10/361,551

(22) Filed: Feb. 10, 2003

(65) Prior Publication Data

US 2003/0140083 A1 Jul. 24, 2003

Related U.S. Application Data

(63) Continuation-in-part of application No. 10/056,166, filed on Jan. 24, 2002.

(51) Int. Cl.
*H04N 5/91* (2006.01)
(52) U.S. Cl. ...................................................... 386/46
(58) Field of Classification Search ................. 725/82, 725/85, 100, 120, 131–142, 152; 386/46, 386/95, 125; 370/486, 487, 535–540
See application file for complete search history.

(56) References Cited

U.S. PATENT DOCUMENTS

| | | | | |
|---|---|---|---|---|
| 5,371,551 A | 12/1994 | Logan et al. | ................. | 348/571 |
| 6,233,389 B1 | 5/2001 | Barton et al. | ................. | 386/46 |
| 6,324,338 B1 | 11/2001 | Wood et al. | ................. | 386/83 |
| 7,065,781 B1 * | 6/2006 | Entwistle | ................. | 725/135 |

* cited by examiner

*Primary Examiner*—Thai Q. Tran
*Assistant Examiner*—Mishawn Dunn
(74) *Attorney, Agent, or Firm*—Suiter Swantz PC LLO

(57) ABSTRACT

The present invention is directed to a system, software system and method for manipulating multimedia broadcast presentations. Manipulating multimedia events offers users increased options in how they experience multimedia presentations. Thus increasing the overall multimedia experience and consequently user satisfaction. Utilization of the present invention allows the user to experience combinations of media previously unavailable. For example, in implementations of the present invention, users may option various combinations of audio and video; including the rate at which a user experiences the media. Further, the user may text search to find starting and stopping points for recording, viewing and pausing operations. The user play programming allows the user to customize how a single media, such as audio, is experienced.

14 Claims, 15 Drawing Sheets

MULTI-CHANNEL PAUSE

TEXT SEARCHING FOR START/STOP OF
A PAUSE OR RECORD OPERATION

PAUSE STOP/ GAP FEATURE

| | |
|---|---|
| Original Source PCM | 15, 17, 18, 14, 24 |
| Overlay 1 | 14, 13, 17, 17, 19 |
| Overlay 2 | 17, 16, 14, 13, 12 |
| Blended Original and Overlay 1<br>Key = lower bits are "01" | 29, 21, 35, 31, 45 |
| Blended Original and Overlay 2<br>Key = lower bits are "11" | 33, 33, 33, 27, 37 |
| Blended Original and Overlays 1&2<br>Key = lower bits are "10" | 46, 36, 49, 46, 56 |

Key example 1

FIG. 17

ENHANCED PERSONAL VIDEO RECORDER INCLUDING USER PLAY PROGRAMMING

CROSS-REFERENCE

This Application is a Continuation In Part of application Ser. No. 10/056,166 and thus the present application claims the benefit under 35 U.S.C. § 120 of U.S. application Ser. No. 10/056,166, filed Jan. 24, 2002, which is herein incorporated by reference in its entirety.

FIELD OF THE INVENTION

The present invention generally relates to the field of video entertainment systems and particularly to a personal video recording system.

BACKGROUND OF THE INVENTION

Presently, the public at large is offered a variety of entertainment selections. As competition between different multimedia presentations increases users may become overwhelmed with choices. While users are typically offered diverse multimedia choices, these selections in some instances may conflict with other multimedia presentations that the user may wish to experience. Other drawbacks to present multimedia presentations include conflicts between the user's schedule and the broadcast of a multimedia presentation and conflicts between members of groups of users.

In order to allow users to optimize their options various technologies have been developed to enable the user some limited flexibility as to which multimedia presentation they will experience. In particular the field of broadcast multimedia presentations includes video cassette recorders (VCR). VCRs allow a user the opportunity to tape a broadcast for replay at a later time. The VCR user is limited to certain primitive data management techniques. VCR data management techniques limit the VCR user to viewing or recording a single broadcast or requires the user to employ multiple VCRs to achieve additional functionality. A VCR user is limited to playing an event, rewinding, fast forwarding, and pausing the recorded event.

A personal video recorder (PVR) offers increased features over that of VCRs such as allowing a user the opportunity to record and view simultaneously. The user of a PVR may even be able to view a delayed presentation of an event being currently recorded, as well as previously recorded events. While the PVR allows additional features in comparison to the VCR, the PVR fails to provide additional features to enhance the user's overall experience.

Drawbacks to current PVRs include limitations on how the user may experience multimedia presentations. While PVRs offer advantages over VCR technology, drawbacks to current PVRs may impact consumer choices. Consumers typically are offered a range of features, which may enhance a user's overall viewing experience. Compelling functional characteristics may add to a user's overall satisfaction with a PVR and ultimately, additional functionality may cause a consumer to purchase one PVR over that of a competing PVR manufacturer or may act as an incentive for a consumer to purchase a higher priced PVR to obtain additional functionality.

Presently, PVRs are limited to recording a multimedia broadcast in its entirety for replay at a later time or for delayed broadcast. Delayed broadcast may include beginning to record a broadcast event and while the event is occurring starting the event for the PVR user. When a current PVR is utilized in the delayed broadcast manner the user may be limited to performing a single time shift, such as the time shift between recording and display, thus a user may not be able to scroll through the stored portion of the event without disturbing the recording of the event.

Current PVRs fail to offer effective data management. Thus, should a current PVR be programmed to store a particular multimedia broadcast, which exceeds available storage capacity this may cause the PVR to record over a previously stored multimedia broadcast that the user may wish to retain. Difficulties in managing data may result in user frustration and dissatisfaction.

An additional disadvantage of current PVRs is the deactivation during a pause, such a one initiated by a user. During a pause while utilizing a current PVR the multimedia presentation output is halted resulting thus no media is presented. This may not meet user desires.

Furthermore, PVRs currently do not allow a user to vary the multimedia experience. For example a user may wish to only to be presented with the audio portion of the media broadcast, be presented with audio from one broadcast while viewing a second broadcast or view a picture-in-picture PIP Therefore, it would be desirable to provide a method and system for providing an enhanced personal video recorder experience. The enhanced personal video recorder system and method may be capable of providing additional functionality thereby allowing a user additional options heretofore unavailable with current PVR systems.

SUMMARY OF THE INVENTION

Accordingly, the present invention is directed to a method and system for managing multimedia broadcasts. The present invention may be included in a personal video recorder (PVR), included on computer readable media and the like. Further, the present invention allows for increase functionality allowing a user more options in experiencing multimedia presentations.

Generally, systems for managing multimedia events contain, a source for generating data streams, a transform for manipulating data streams and a sink for outputting data streams to an output device. Typically, systems for managing multimedia events are implemented on central processing unit (CPU), as part of a software program contained on electronically readable medium, and the like. Multimedia management systems often are included in PVRs and the like. Previous multimedia broadcast management systems have relied on the transform to manage data. Thus, previous multimedia broadcast management systems offered limited functionality.

In a first example of the present invention, a multimedia broadcast management system is implemented as a central processing unit programmed to generate a source, a transform, and a sink. Managing multimedia broadcast events through the present broadcast management system allows for more effective data management and greater user satisfaction. The multimedia broadcast management system, of the present invention, may be included as part of an enhanced PVR or the like. Presently, the source is utilized to manage data streams through the multimedia broadcast system, as data streams representing multimedia broadcast events are generated, transformed and subsequently output for the user to experience.

Second, a method for managing multimedia presentations is described. The present method is initiated at the reception of a multimedia broadcast signal. A record data stream representing the broadcast signal is then generated and subsequently decoupled for buffering prior to being sent to a transform. Management of transform tasks in the present example is conducted by the source. After transformation, a service data stream is sent from the transform to a sink for output. Prior to being output to an output device as a playback data stream, a sink task managed from the source may be conducted. Additionally, posted interrupts from the transform and the sink may be processed by the source for further managing multimedia broadcast presentations.

Furthermore, a multimedia broadcast management system in embodiments is managed from a sink. The multimedia broadcast management system of the present invention is implemented as a central processing unit programmed to generate a source for generating a record data stream, a transform capable of manipulating the record data stream, and the sink additionally capable of outputting a playback data stream to an output device. The multimedia broadcast management system of the present example may be included in a PVR and the like. In the current aspect, a source capable of conducting source tasks, such as generating a record data stream representing a multimedia broadcast event, decoupling, buffering data and the like, is managed by the sink. Upon completion of the source tasks, the record data stream is sent to a transform. The transform is capable of conducting a transform task on the record data stream, such as storing the data on the buffer connected to the transform. In the present example transform tasks are managed from the sink. As part of the transform task a service data stream is sent to the sink for subsequent output to an output device.

In a further aspect of the invention, a sink based method for managing multimedia presentations is discussed. The method is initiated through the reception of a multimedia broadcast signal. Source tasks, managed from the sink are then conducted. In the present example source tasks include sending a record data stream to a transform. Subsequent to being received from the source, a transform task managed from the sink is conducted on the record data stream. After the record data stream is transformed, a service data stream is sent to the sink for output. The sink may further conduct a sink task before providing a playback data stream to an output device. Additionally, interrupts posted by the transform and the source may be processed by the sink for further managing multimedia presentations.

Additionally, a method for providing video display during a pause is discussed. Through the utilization of the present invention, users may opt to experience multimedia events in different ways previously unknown in broadcast management systems. The present method allows for the loading of a preferred video, including a still display which may be updated with relevant data. In the current method, the user may opt to view alternative video displays during the pause. Subsequently, the user is offered various viewing options pertaining to how the user wishes to view the paused event.

In a further example, during a pause a user may experience a preferred audio, such as music, a periodic beep and the like. The user may then option to vary the audio output, for example listen to a different program's audio during the pause. At the restart of the paused broadcast the user may be allowed the option of experiencing the resumed broadcast in a variety of ways, such as viewing at an accelerated rate from the pause.

In another example, the user may be given the option to experience other broadcast events during a pause. For example, the user may choose to experience the audio and video from an alternative broadcast during the pause in the initial event. Upon resumption of the initial event, the user may choose various ways of experiencing the remaining portion of the initial event.

Furthermore, the multimedia broadcast management system may provide the user the option of timing-out after a set period. This may include turning off an associated television or the like. The user may be optioned to turn off various devices after a set pause time, and upon a failure by the user to respond, the broadcast management system may turn off selected operations while continuing essential operations such as recording.

In a delayed presentation operation, such as when recording of an event has begun but has not completed, the user may have the option of scrolling through an unviewed portion of the event. The user may scroll from the inception of the pause operation till the event is viewed in real time. The user may further choose to restart the event from the position to which the user scrolled.

In embodiments of the present invention, the user is capable of managing data by accessing a record/pause set up or a data set-up. Thus the user may prioritize broadcasts, such as to ensure that a particular event is not erased.

In further examples of the present invention, the multimedia broadcast management system is suitable for displaying multiple video displays. Thus, the user may option to view a second broadcast video image as part of the first video image.

Additionally, the multimedia broadcast management system of the present invention may be suitable for conducting word or phrase searches so that the user may option to start viewing at the occurrence of a word or phrase.

BRIEF DESCRIPTION OF THE DRAWINGS

The numerous advantages of the present invention may be better understood by those skilled in the art by reference to the accompanying figures in which:

FIG. 17 is a key example for identifying component data streams; and

DETAILED DESCRIPTION OF THE INVENTION

Reference will now be made in detail to the presently preferred embodiments of current invention, examples of which are illustrated in the accompanying drawings.

Referring generally now to FIGS. 1 through 13, exemplary embodiments of the present invention are discussed, wherein an enhanced system and method for managing multimedia broadcast presentations is employed. Current PVRs offer limited functionality in how a user may experience multimedia presentations. The limited functionality of current PVRs may be related to their management of data. Data management in existing PVRs is conducted through a transform controlling the flow of data through the PVR. Utilization of the present invention allows for more flexibility for a user of a PVR leading to an enhanced multimedia experience.

Figure 1:
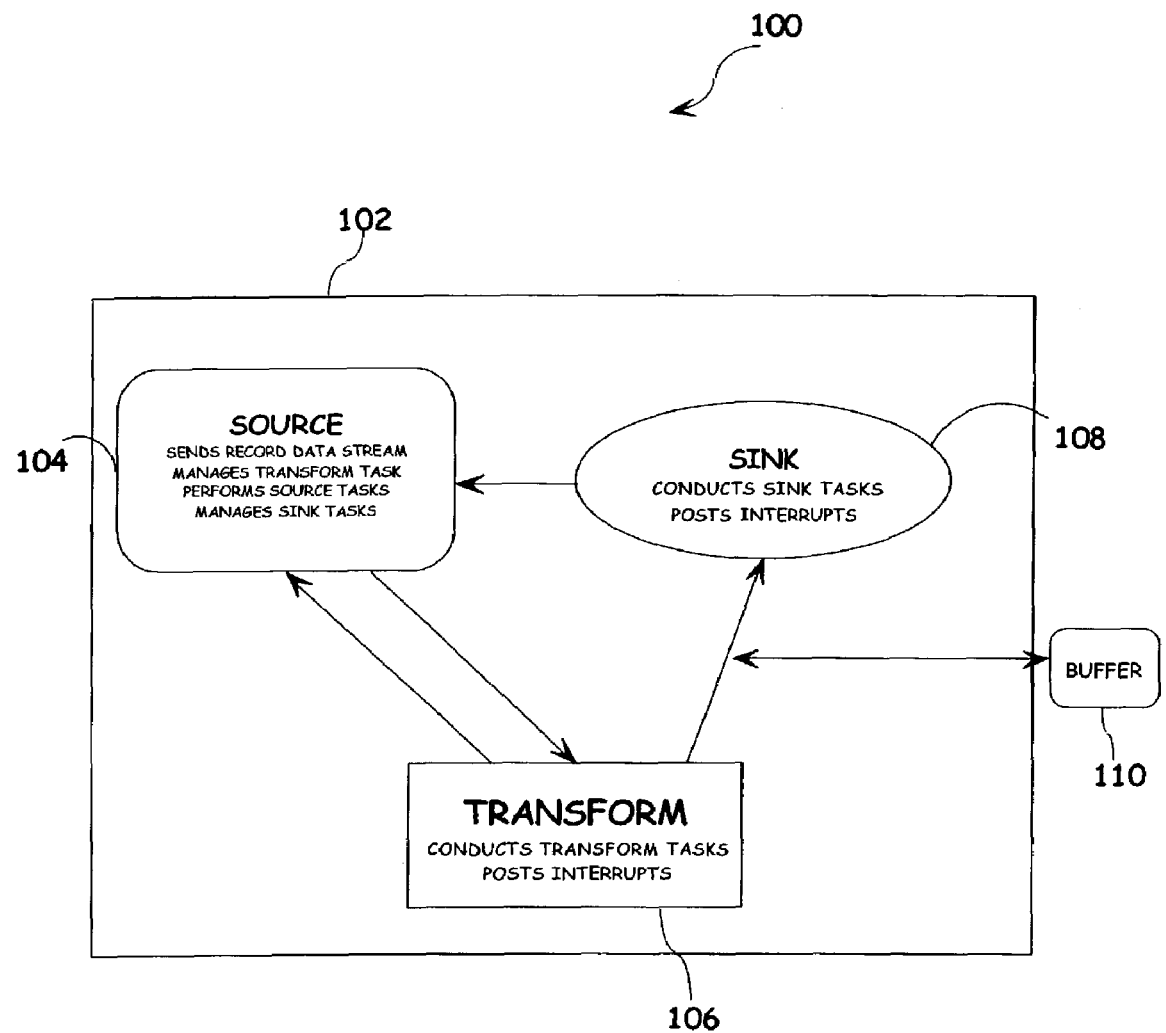
FIG. 1 is an overview illustration of an exemplary embodiment wherein a multimedia broadcast management system is source managed.

Referring to FIG. 1, in a first embodiment of the present invention a multimedia broadcast management system 100 is discussed. In the present embodiment, the multimedia broadcast management system 100 is a source managed system. The present invention may be employed as part of an overall system such as a PVR and may be included as an algorithm, such as one encoded on a central processing unit (CPU) 102 included in a PVR, encoded on an electronically readable medium, and the like.

Initially, a multimedia presentation broadcast is transmitted by a provider. The multimedia broadcast may be transmitted through different technologies, for example the broadcast may be from a cable television provider, a satellite broadcast provider, from traditional over the air television signal provider, from a downloadable broadcast provider and the like. The broadcast may be received through an appropriate receiver for accepting the broadcast. For example in the case of a satellite, the broadcast is initially received via a satellite dish and associated decoder for communication to a PVR employing the multimedia broadcast management system 100 of the present invention.

The CPU 102 in the present embodiment is encoded to effectively generate a source 104, a transform 106, and a sink 108. The source 104, may be capable of receiving the multimedia broadcast. The source 104 may be capable of generating a record data stream representing the multimedia broadcast. The record data stream may include component portions representing an audio portion, a closed caption portion, a video portion, and the like of the broadcast event. Furthermore, in the present embodiment the source 104 is capable of managing multiple data streams representing multiple events recorded at different times as well as "live" broadcasts which are passed through the multimedia broadcast management system 100 in real time.

The source 104, may be capable of decoupling the component media portions included in the record data stream. Decoupled media components may allow the user to experience a portion of the broadcast event independently of another portion of the broadcast event, such as by providing the audio component of the broadcast while the video portion is halted during a pause initiated by a user, thus retaining an active pause.

The record data stream may be buffered prior to sending the record data stream to the transform 106 connected to the source 104. The record data stream may be buffered so as to create buffers of data to be sent through the multimedia broadcast management system 100. In various embodiments buffering the record data stream includes temporarily storing the data. In the present embodiment the buffered data stream is sent from the source 104 to the transform 106.

The transform 106 may be capable of performing a transform task on the record data stream received from the source 104 connected to the transform 106. Transform tasks include at least one of storing data on a buffer 110 connected to the transform 106, retrieving data from the buffer 110 and providing a service data stream to the sink 108. In various embodiments transform tasks are managed from the source 104. Managing transform tasks may include launching the transform task to be performed. In the present embodiment, the transform 106 may post an interrupt to the source 104, for example the transform may post an interrupt to the source 104 indicating that data transfer is complete. Furthermore, the transform 106 may be capable of controlling the flow of data received from the source 104.

Connected to the source 104 and the transform 106 is a sink 108. The sink 108 may be capable of providing a sink data stream to an output device. The output device may include a television capable of accepting a digital signal and the like. The sink 108 may be capable of posting an interrupt to the source 104 such as interrupt signaling the completion of data transfer to the output device. In various embodiments, sink tasks may be managed through the source 104. Managing sink tasks may include launching sink tasks. Sink tasks include at least one of providing a playback data stream to an output device, temporarily buffering data, controlling the flow of data through the sink 108. For example controlling the flow of data may include the flow of data from the transform 106 to the sink 108.

In additional embodiments the sink 108 may be capable of accepting a user input control. For example, accepting a user input control may include a pause command by a user, a time shift, a data prioritization, altering the flow of data from the sink, placing a marker, searching stored data. Data prioritization may include modifying priorities with respect to stored data such as, adding a no erase marker to save a particular event, authorizing the deletion of an event, prioritizing stored events. Altering the flow of data may include fast forwarding, rewinding, conducting a slow motion operation. Placing a marker in the present embodiment includes enabling a user to mark a point in an multimedia broadcast such that the user may return to the selected point and the like. Searching stored data may include scrolling through events, an event, and searching closed caption information for a particular word such as "score", "touchdown", "goal" and the like. User input controls may be communicated to the sink 108 by a remote control for utilization with a PVR employing the present invention.

Figure 2:
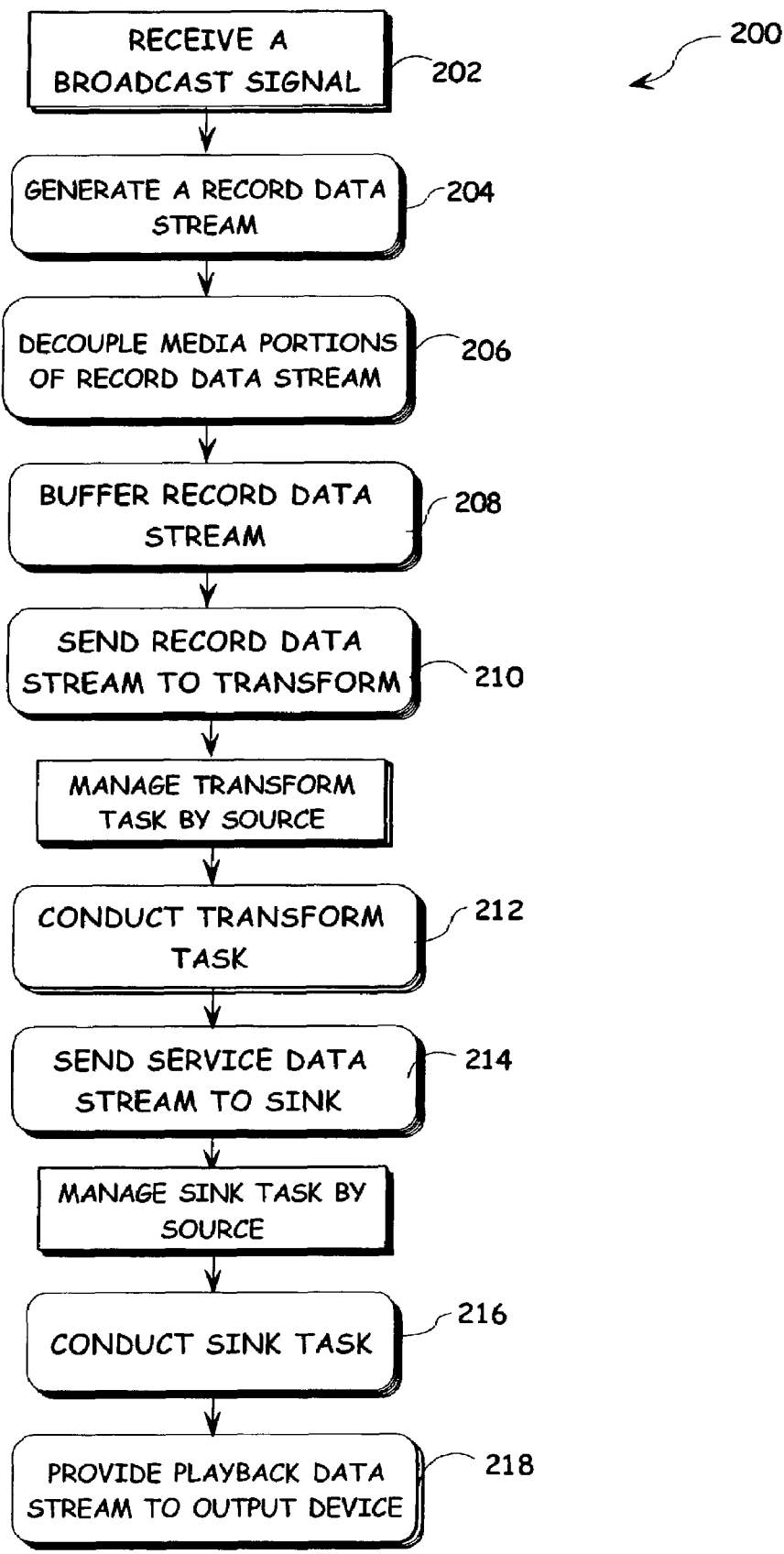
FIG. 2 is a flow chart of a method for managing multimedia broadcast presentations, in a source managed system.

Referring to FIG. 2 a method for managing multimedia broadcast presentations 200 will be discussed. Initially, a broadcast signal, such as a signal from a cable provider or the like is transmitted for reception. Receiving a multimedia broadcast signal 202 may include receiving at least two media component portions. Multimedia broadcasts typically include a video portion, an audio portion and in some examples, additional information. For example, multimedia broadcasts may include closed captioning information.

Upon reception of the multimedia broadcast 202, a source may generate a record data stream representing the multimedia broadcast. Generating a record data stream 204 may include component portion data, such as data representing an audio portion, a video portion, or the like of a multimedia broadcast event. For example, a typical multimedia broadcast of a sports event would include a video portion, an audio portion and closed caption information.

After the data stream is generated 204 the source may decouple the component media portions of the record data stream. Decoupling 206 may include separating data representing an audio signal from data representing a video signal and the like.

Once decoupling 206 the component portions of the record data stream is achieved, the record data stream may be buffered 208. Buffering the decoupled data stream 208 may include temporarily storing the record data stream, generating buffers of information for transport to a transform. For example, buffering 208 may include temporarily storing the record data stream, packetizing the record data stream into portions for subsequent storage, to facilitate data transport through a multimedia broadcast management system and the like.

After the record data stream is buffered 208, the stream of data may then be sent to the transform. Sending the buffered record data stream to a transform 210 may be managed from the source. While managing streaming data through the multimedia broadcast system may be accomplished by the source in embodiments the source is capable of accepting posted interrupts from the transform and the sink. For example, should the transform be unable to accept data this is processed by the source to allocate multimedia broadcast management system resources. An additional example includes, posting interrupts by the transform relating to the completion of accepting data from the source.

Upon receipt of data sent from the source the source manages transform tasks. Managing the transform tasks may include launching the transform task by the source. A transform task is at least one of storing data on a buffer, retrieving data from the buffer, sending a service data stream to a sink, and transforming data. The transform may conduct 212 the desired transform on the data stream as managed from the source.

The record data stream passed through the transform subsequently is sent to a sink. The sending of data to the sink 214 may be managed by the source and in various embodiments with post interrupts, such as a delay message from the sink being posted to the source for processing. Additionally managed from the source, is a sink task. In the present embodiment managing sink tasks includes launching the sink task.

Conducting a sink task 216 includes at least one of accepting a service data stream from the transform, temporarily storing data, and controlling the flow of data from the sink.

The stream of data in the sink may then be provided to an output device. Providing a playback data stream 218 to an output device may include sending a playback data stream to a television with a decoder capable of converting the playback data stream into a video and a audio signal, a closed caption signal and the like.

In further embodiments the method for managing multimedia broadcasts 200 may include accepting a user input control by the sink. For example, accepting a user input control may include a pause command by a user, a time shift, a data prioritization, altering the flow of data from the sink, searching stored data. Data prioritization includes modifying priorities with respect to stored data such as, adding a no erase marker to save a particular event, authorizing the deletion of an event, prioritizing stored events. Altering the flow of data may include fast forwarding, rewinding, conducting a slow motion operation. Searching stored data may include scrolling through events, an event, and searching closed caption information for a particular word such as "score", "touchdown", "goal" and the like.

Figure 3:
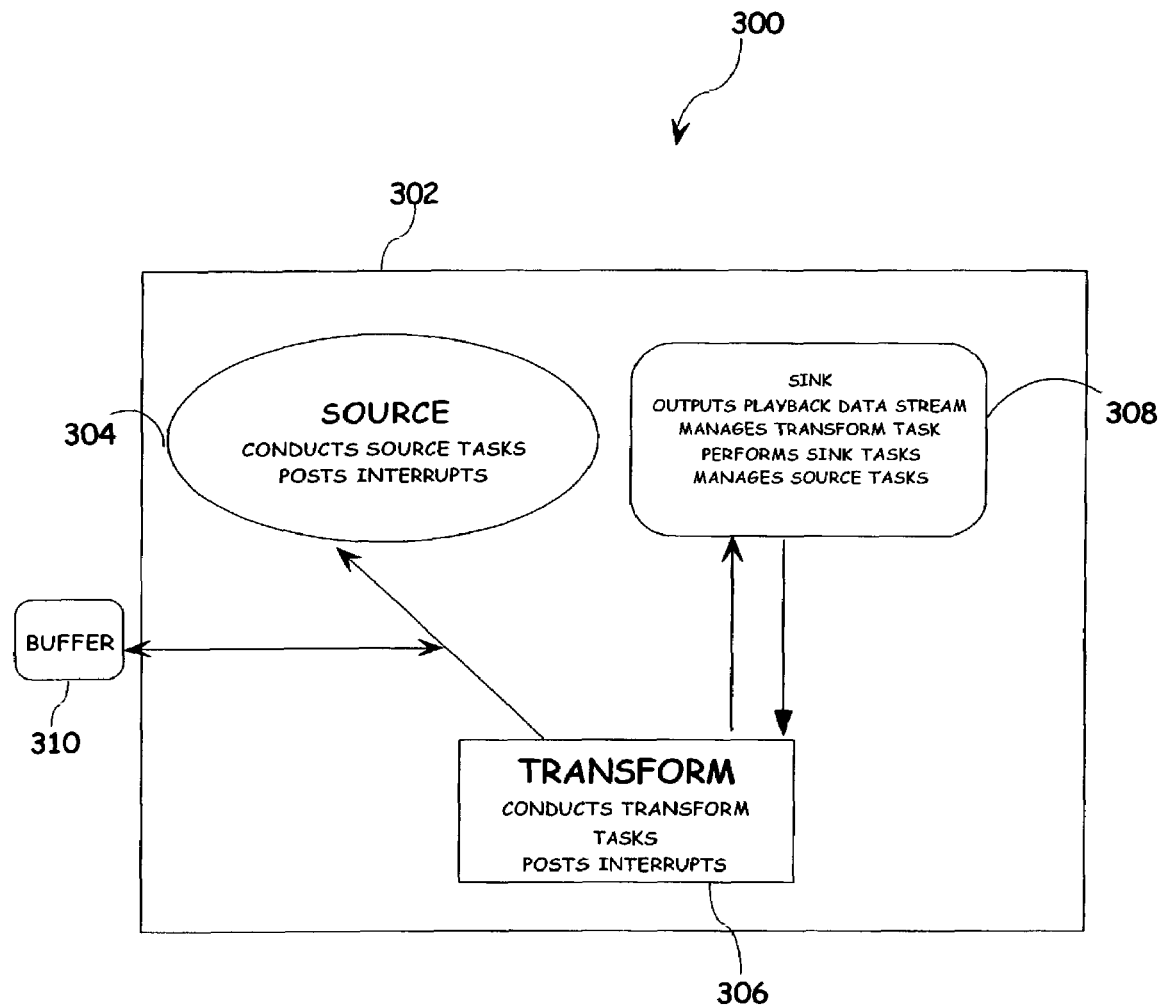
FIG. 3 is an overview illustration of an exemplary embodiment wherein a multimedia broadcast management system is sink managed.

Referring to FIG. 3, in an embodiment of the present invention a multimedia broadcast management system 300 is discussed. In the present embodiment the multimedia broadcast management system 300 is a sink managed system. The present invention may be included as part of an overall system such as a PVR, such as one encoded on a central processing unit (CPU) 302 included in a PVR, encoded on an electronically readable medium or the like.

Initially, a multimedia presentation broadcast is transmitted by a provider. The multimedia broadcast may be transmitted through different technologies, for example the broadcast may be from a cable television provider, a satellite broadcast provider, from traditional over the air television signal provider, from a downloadable broadcast provider and the like. The broadcast may be received through an appropriate receiver for accepting the broadcast. For example in the case of a satellite, the broadcast may be initially received via a satellite dish and associated decoder for communication to a PVR employing the multimedia broadcast management system 300 of the present invention.

The CPU 302, in the current embodiment is encoded to effectively generate a source 304, a transform 306, and a sink 308. The source 304, is capable of receiving the multimedia broadcast. The source 304 is capable of generating a record data stream representing the multimedia broadcast. The record data stream may include component portions representing an audio portion, a closed caption portion, a video portion, and the like of the broadcast event. Furthermore, in the present embodiment source tasks are managed through the sink 308. Source tasks include at least one of generating a record data stream, decoupling component portions of the record data stream, buffering the record data stream, temporarily storing the record data stream, and sending the record data stream to the transform. The sink 308 is capable of managing multiple data streams representing multiple events recorded at different times as well as "live" broadcasts which are passed through the multimedia broadcast management system 300 in real time.

The source 304, may be capable of decoupling the component media portions included in the record data stream. Decoupled media components allow the user to experience a portion of the broadcast event independently of another portion of the broadcast event, such as by providing the audio component of a broadcast while the video portion is halted during a pause initiated by a user, thus retaining an active pause.

The record data stream may be buffered prior to sending the record data stream to the transform 306 connected to the source 304. The record data stream may be buffered so as to create buffers of data to be sent through the multimedia broadcast management system 300. In various embodiments buffering includes temporarily storing the record data stream, packetizing the record data stream into portions for subsequent storage, to facilitate data transport through a multimedia broadcast management system and the like. In the present embodiment the buffered data stream is sent from the source 304 to the transform 306.

Furthermore, the source 304 may be capable of posting interrupts to the sink 308. Posting interrupts includes posting an interrupt indicating the data transfer to the transform is complete, data is being received, data is being decoupled and the like.

The transform 306 may be capable of performing a transform task on the record data stream received from the source 304 connected to the transform 306. Transform tasks include at least one of storing data on a buffer 310 connected to the transform 306, retrieving data from the buffer 310 and providing a service data stream to the sink 308. In the present embodiment transform tasks are managed from the sink 308. Managing transform tasks may include launching the transform task to be performed. In the present embodiment, the transform 306 may post an interrupt to the sink 308, for example the transform may post an interrupt to the sink 308 indicating that data transfer is complete. Furthermore, the transform 306 may be capable of controlling the flow of data received from the source 304.

Connected to the source 304 and the transform 306 is the sink 308. The sink 308 may be capable of providing a sink data stream to an output device. Output devices include televisions capable of accepting digital signals and the like. The sink 308, in the present embodiment is capable of accepting an interrupts posted from the source 304 and the transform 306.

Further, the sink in addition to managing the source 304 and the transform 306 manages its own tasks as well including the launching of sink tasks. Sink tasks include at least one of providing data to an output device, temporarily buffering data, controlling the flow of data through the sink 308. For example controlling the flow of data includes the flow of data from the sink 308 to an output device.

In additional embodiments, the sink 308 is capable of accepting a user input control. For example, accepting a user input control includes a pause command by a user, a time shift, a data prioritization, altering the flow of data from the sink, placing a marker searching stored data. Data prioritization may include modifying priorities with respect to stored data such as, adding a no erase marker to save a particular event, authorizing the deletion of an event, prioritizing stored events. Altering the flow of data includes fast forwarding, rewinding, conducting a slow motion operation and the like. Placing a marker in the present embodiment includes enabling a user to mark a point in an multimedia broadcast such that the user may return to the selected point and the like. Searching stored data may include scrolling through events, an event, and searching closed caption information for a particular word such as "score", "touchdown", "goal" and the like. User input controls may be communicated to the sink 308 by a remote control for utilization with a PVR employing the present invention.

Figure 4:
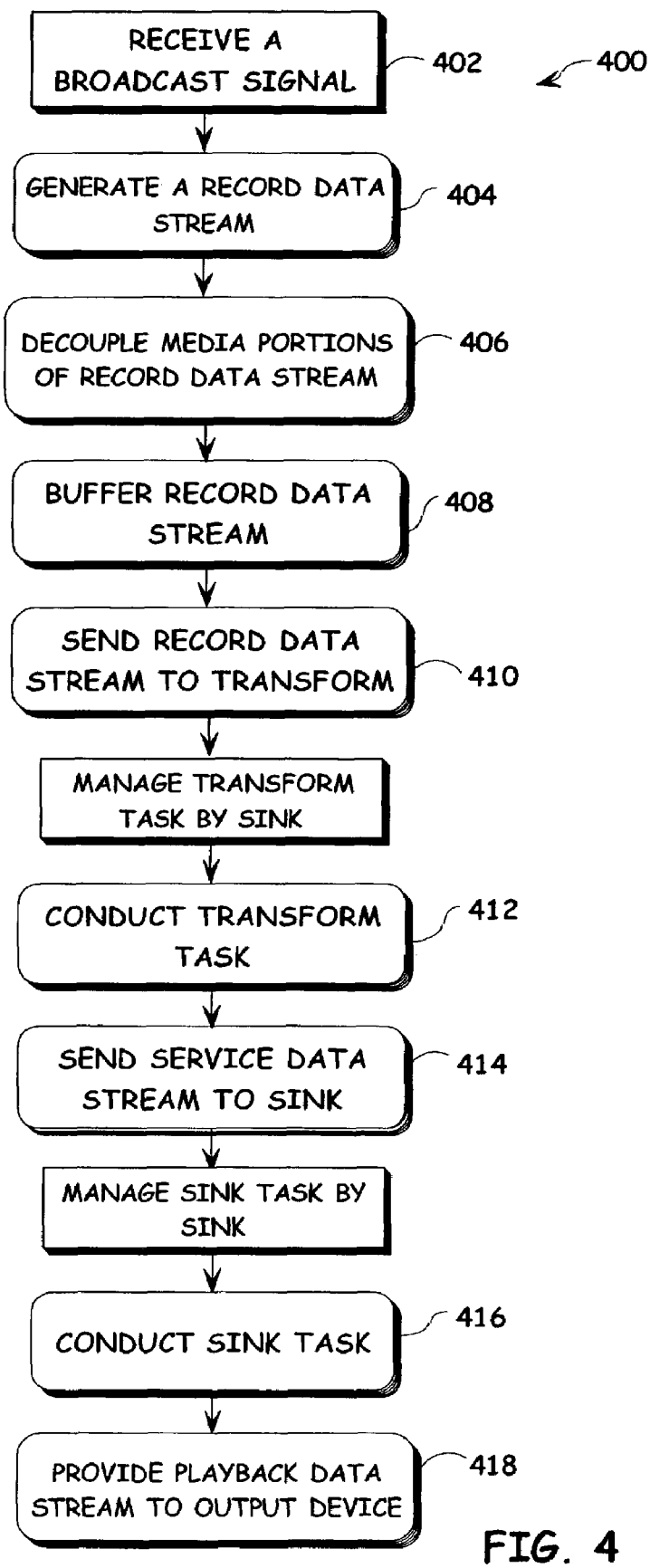
FIG. 4 is a flow chart of a method for managing multimedia broadcast presentations, in a sink managed system.

Referring to FIG. 4 a method for managing multimedia broadcast presentations 400 is discussed. Initially, a broadcast signal, such as a signal from a cable provider or the like is transmitted for reception. Receiving a multimedia broadcast signal 402 may include receiving at least two media component portions. Multimedia broadcasts typically include a video portion, an audio portion and in some examples, additional information. For example, multimedia broadcasts often include closed captioning information.

Upon reception of the multimedia broadcast 402, a source may generate a record data stream representing the multimedia broadcast. Generating a record data stream 404 may include component portion data, such as data representing an audio portion, a video portion, or the like of a multimedia broadcast event. For example, a typical multimedia broadcast of a sports event would include a video portion, an audio portion and closed caption information.

After the data stream is generated 404 the source may decouple the component media portions of the record data stream. Decoupling 406 includes separating data representing an audio signal from data representing a video signal and the like.

Once decoupling 406 the component portions of the record data stream is achieved, the record data stream may be buffered 408. Buffering the decoupled data stream 408 may include temporarily storing the record data stream, generating buffers of information for transport to a transform. For example, buffering 408 includes packetizing the record data stream into portions for subsequent storage, to facilitate data transport through a multimedia broadcast management system and the like.

After the record data stream is buffered 408 the stream of data may then be sent to the transform. Sending the buffered record data stream to a transform 410 in the present embodiment is managed from the sink. While managing streaming data through the multimedia broadcast system is accomplished by the sink, the sink may be capable of accepting posted interrupts from the transform and the source. For example, should the transform be unable to accept data this is processed by the sink to allocate multimedia broadcast management system resources. Additional examples include, posting interrupts by the transform relating to the completion of accepting data from the source.

In the present embodiment, the sink manages both source tasks and transform tasks in addition to sink tasks. Source tasks include at least one of generating a record data stream, decoupling component portions of the record data stream, buffering the record data stream, temporarily storing the record data stream, and sending the record data stream to the transform. Furthermore, managing source tasks may include launching source tasks.

Managing the transform task includes launching the transform task by the sink. A transform task is at least one of storing data on a buffer, retrieving data from the buffer, sending a service data stream to the sink, and transforming data. The transform may conduct 412 the desired transform on the record data stream as managed from the sink.

The record data stream passed through the transform may be sent to the sink. The sending of the service data stream to the sink 414 is managed by the sink in the present embodiment. In various embodiments posted interrupts, such as a delay message, from the transform are posted to the sink for processing. In the current embodiment the sink manages its own sink tasks including launching sink tasks.

Conducting a sink task 416 may include at least one of accepting a service data stream from the transform, temporarily storing data, and controlling the flow of data from the sink.

The playback stream of data in the sink may then be provided to an output device. Providing a playback data stream 418 to an output device includes sending a playback data stream to a television with a decoder capable of converting the playback data stream into a video and a audio signal, a closed caption signal and the like.

In further embodiments the method for managing multimedia broadcasts 400 includes accepting a user input control by the sink. For example, accepting a user input control may include accepting a pause command by a user, a time shift, a data prioritization, altering the flow of data from the sink, searching stored data. Data prioritization may include modifying priorities with respect to stored data such as, adding a no erase marker to save a particular event, authorizing the deletion of an event, prioritizing stored events. Altering the flow of data may include fast forwarding, rewinding, conducting a slow motion operation. Searching stored data may include scrolling through events, an event, and searching closed caption information for a particular word such as "score", "touchdown", "goal" and the like.

Figure 5:
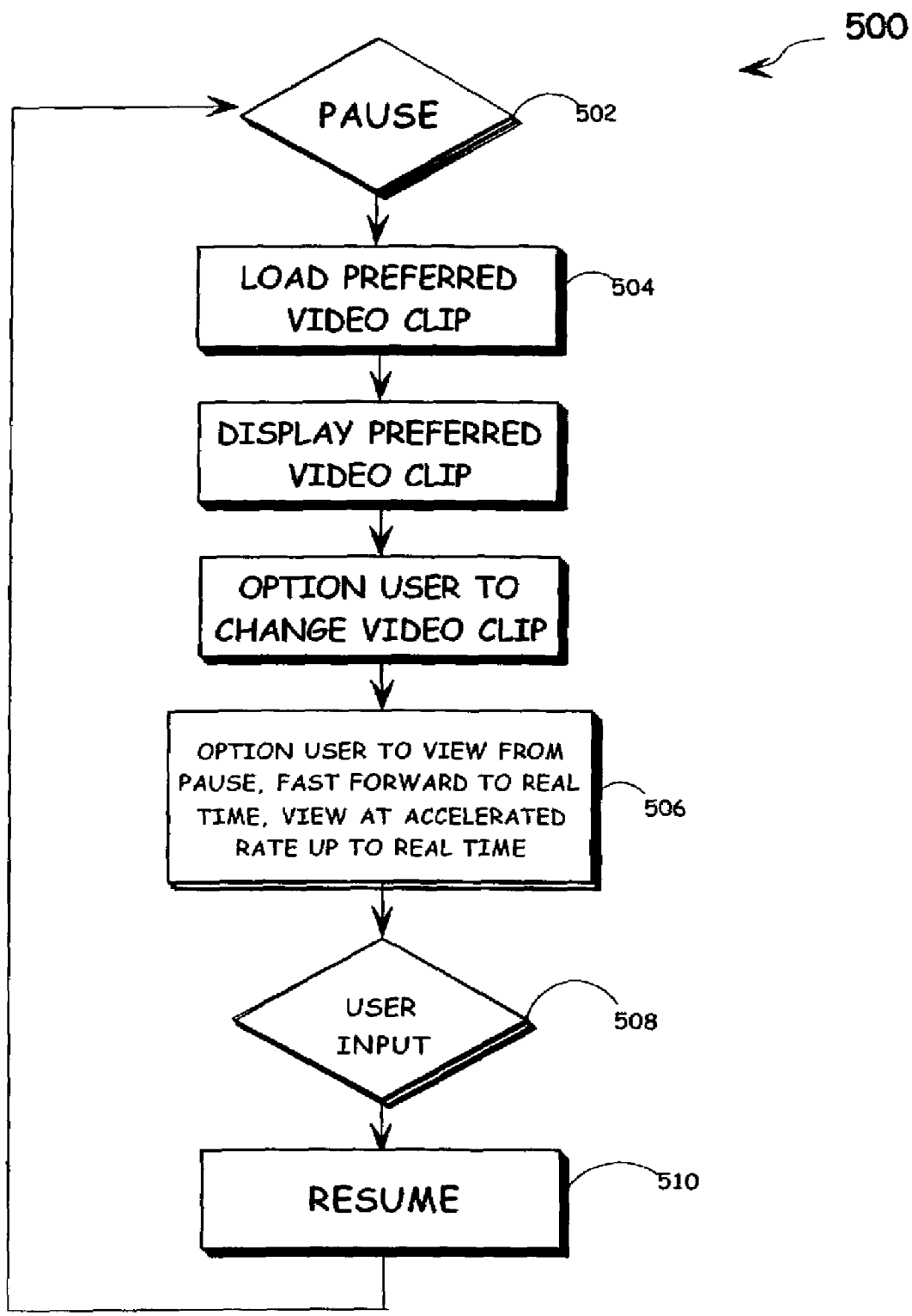
FIG. 5 is a flow chart of a method for providing an alternate video clip during a pause.
Figure 6:
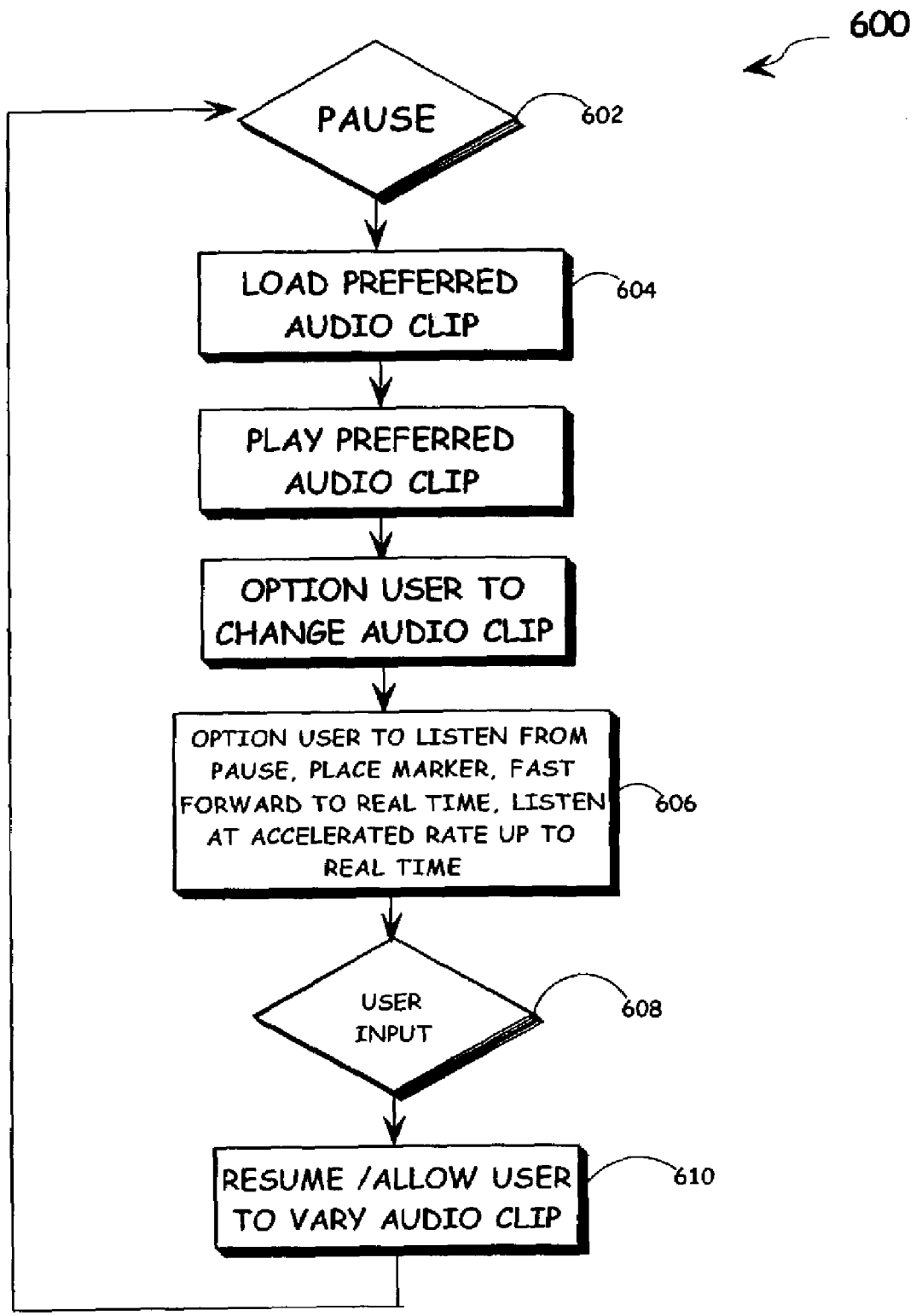
FIG. 6 is a flow chart of a method for providing an alternate audio clip during a pause.

Referring now to FIG. 5 a flow chart of an exemplary method for providing an alternative video clip during a pause 500 will be discussed. Providing additional functionality such as the ability to provide a different video clip may be achieved through the implementation of a multimedia broadcast management system, as previously described. For the purposes of the present embodiment reference will be made to a source managed multimedia broadcast management system such as discussed in FIG. 1. It is to be understood that the present method may be implemented in other embodiments of the present invention without departing from the spirit and scope of the present invention.

The method for providing an alternative video clip may be initiated by a user inputting a pause control 502. Inputting a pause control 502 may include using a control device such as a remote control to provide a signal to a sink 108 (FIG. 1). In the current embodiment the signal may be received by a PVR employing the method of the current embodiment.

Once the pause command is received the multimedia broadcast management system may load a preferred video clip. Loading a preferred video clip 504 may include a source managing the multimedia broadcast management system to retrieve stored data indicating a pause status on a display device, an alternative stored video, a real time video display and the like. The preferred video clip may be a still screen and indicate the pause and additional information, such as the amount of time the system has been paused and the like. Additionally, the user may be optioned to vary the video clip displayed during the pause. For example, the user may switch from the preferred video clip indicating a pause to a video clip which is updated with information such as the duration of the pause, video from a "live" broadcast and the like.

Upon resumption of the broadcast, for example by the input of a user control, the user may be optioned to resume the broadcast at a different time period. Optioning the user 506 may include allowing the user to input whether they wish to view the remaining portion of the event in real time, view the remaining portion at a normal pace from the initiation of the pause 502, view the event from the pause at an accelerated rate such that the event will reach real time over a certain time period. Once the user inputs the option they desire 508, such as resume from the paused location at normal rate the multimedia even may resume 510.

Referring generally now to FIGS. 6-13 an exemplary method for providing a alternative audio 600 will be discussed. Providing a different audio clip during a pause may be achieved through the implementation of a multimedia broadcast management system, as previously described. In additional embodiments the present method may be implemented as part of an overall method for managing multimedia broadcast presentations. For the purposes of the present embodiment reference will be made to a source managed multimedia broadcast management system such as discussed in FIG. 1. It is to be understood that the present method may be implemented in other embodiments of the present invention without departing from the spirit and scope of the present invention.

The method for providing an alternative sound may be initiated by a user inputting a pause control 602. Inputting a pause control 602 may include using a control device such as a remote control to provide a signal to a sink 108 (FIG. 1). In the current embodiment the signal may be received by a PVR employing the current method.

Once the pause command is received, the multimedia broadcast management system may load a preferred audio clip. Loading a preferred audio clip 604 may include a source managing the multimedia broadcast management system to retrieve stored data indicating a pause such as a periodic beep, an audio portion of another multimedia broadcast, prerecorded audio, such as music and the like. Additionally the user may option to vary the audio clip. For example, the user may switch from a periodic beep to music during the pause.

Upon resumption of the broadcast, for example by the input of a user control, the user may be optioned to resume the broadcast at a different time period. Optioning the user 606 may include allowing the user to input whether they wish to listen to the remaining portion of the event in real time, listen to the remaining portion at a normal pace from the initiation of the pause 602, listen to the event from the pause at an accelerated rate such that the event will reach real time over a certain time period. Once the user inputs the option they desire 608, such as resume from the paused location at normal rate the multimedia event may resume 610. Furthermore, at resumption the user may vary the audio/video combination. For example the user may resume video display while playing the audio clip from the pause.

Figure 7:
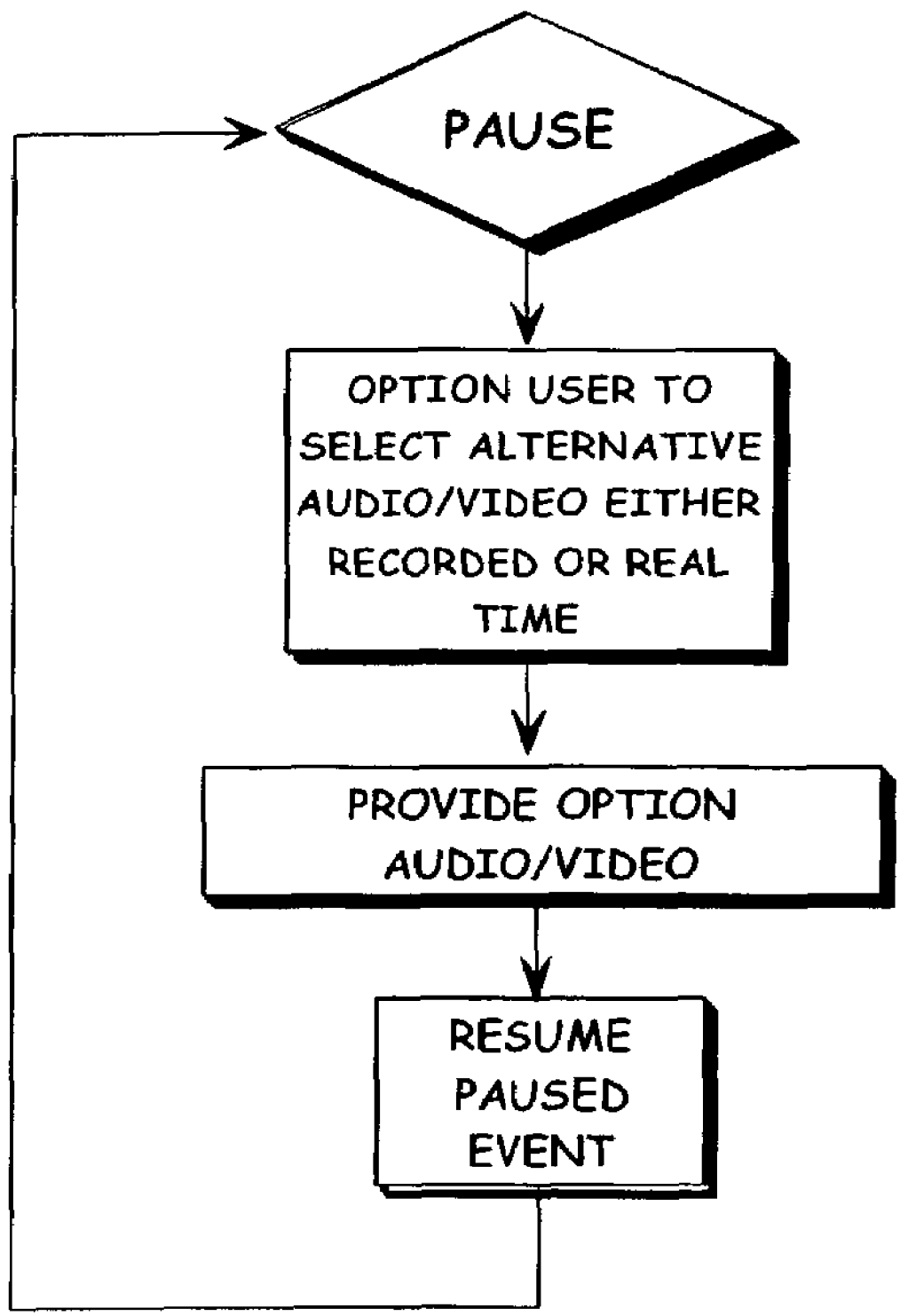
FIG. 7 is a flow chart of a method for providing an alternate audio/video during a pause.

Referring generally to FIG. 7 a method for providing alternative audio and video clips will be discussed generally. The method may be initiated by a user inputting a pause control. In the present embodiment alternative audio and video clips may include a different recorded event, a real time event, such as a live event, and the like.

Figure 8:
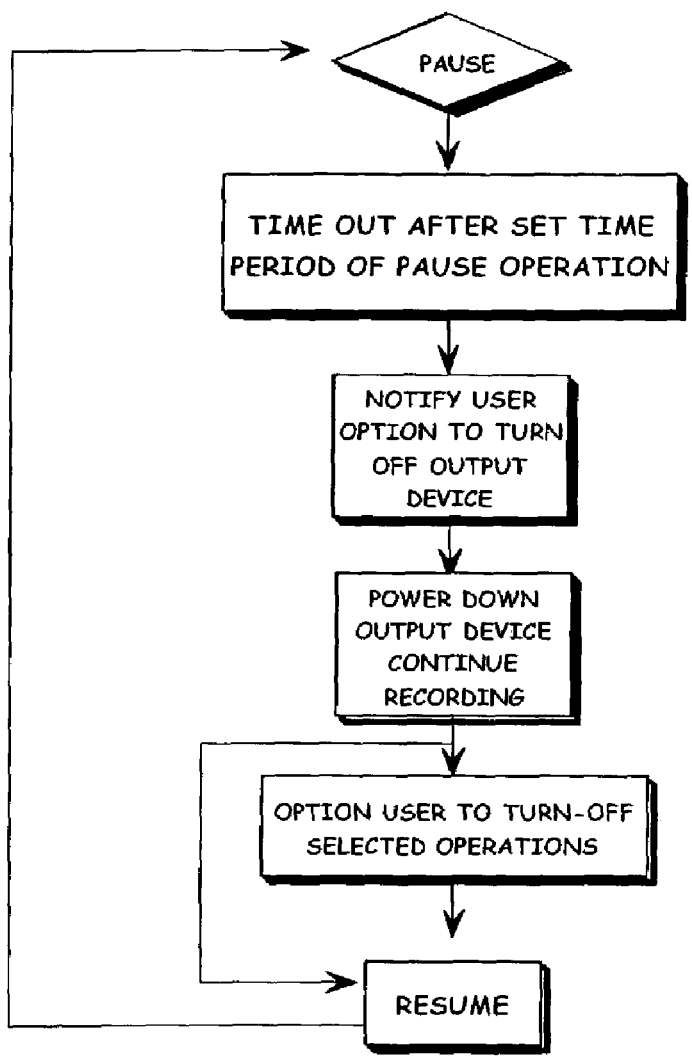
FIG. 8 is a flow chart of a method for controlling power for an additional device.

Referring generally to FIG. 8 a method for controlling power for an additional device is discussed. For example a PVR employing a multimedia broadcast management system of the present invention may include a power strip for additional external devices such as a television, which may be controlled by the current method. Generally the method is initiated by a pause in operation. After a set time which may be predefined, defined by a user or the like a device implementing the method may cause the power to be shut off. In further embodiments a PVR implementing the current method may contain a device capable of transmitting a signal to an associated external device such as a television causing the associated television to turn-off.

Figure 9:
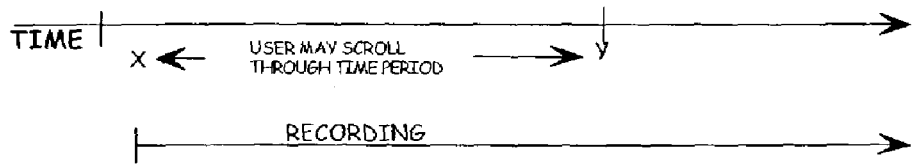
FIG. 9 is a flow chart of a method for scrolling though a pause during delayed broadcast utilization.

Referring generally to FIG. 9 a representation of a pause operation including a scrolling through the recorded portion of a multimedia broadcast while a multimedia broadcast system is recording the end of the event, such as in a delayed mode. For example, a user may wish to begin recording a broadcast event and then start watching at a later time. The user may scroll through the time period between initialization of a pause x and the current portion of the event being recorded y.

Figure 10:
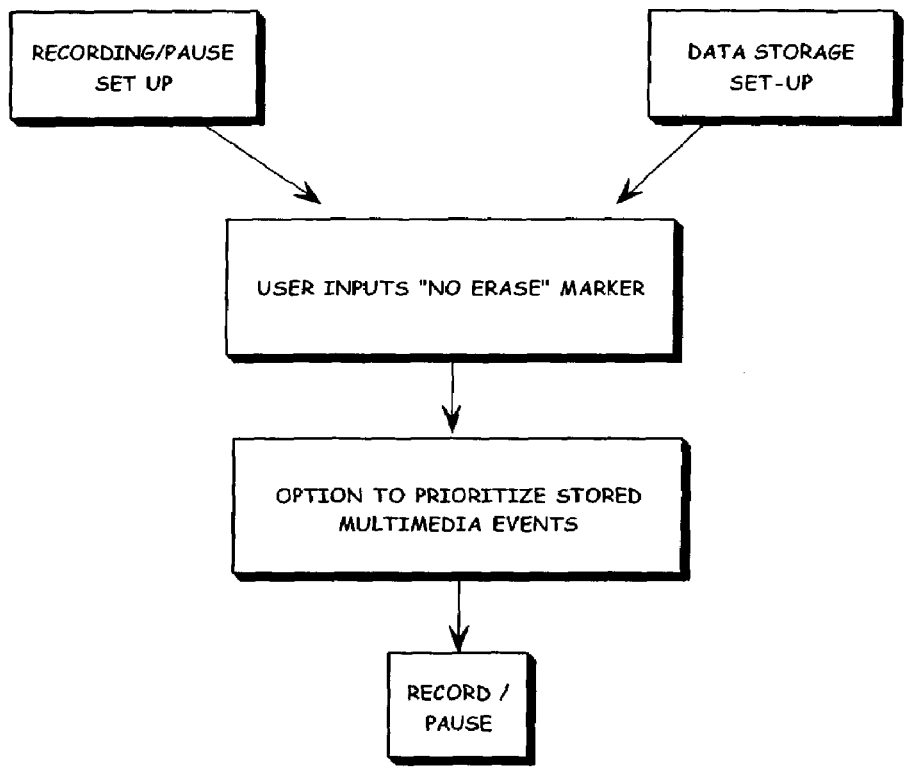
FIG. 10 is a flow chart of a method for managing data from a recording/pause set up and from a data storage set-up.

Referring generally to FIG. 10 a flow chart representation of managing data is shown. For example in the present embodiment the user control input of a "no erase" marker may be achieved through the recording set-up or alternatively through a data storage set-up user input control interface.

Figure 11:
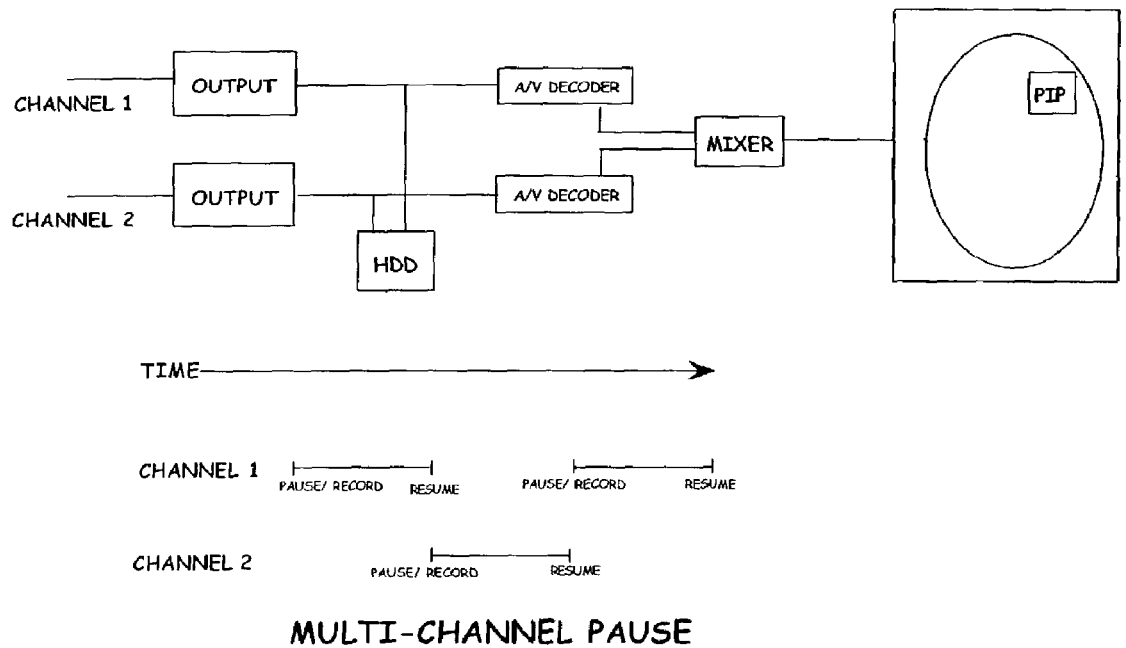
FIG. 11 is an exemplary embodiment of a system for providing a multi-broadcast experience.

Referring generally to FIG. 11, a system for accepting multiple broadcast event output is discussed. In the present embodiment, the multimedia broadcast management system may provide multiple events to allow the user to experience a video, an audio clip from an alternative event while viewing the primary event. Further, the multiple event viewing may include a user pausing/recording a first channel's event and then pausing/recording a second channel's event.

Figure 12:
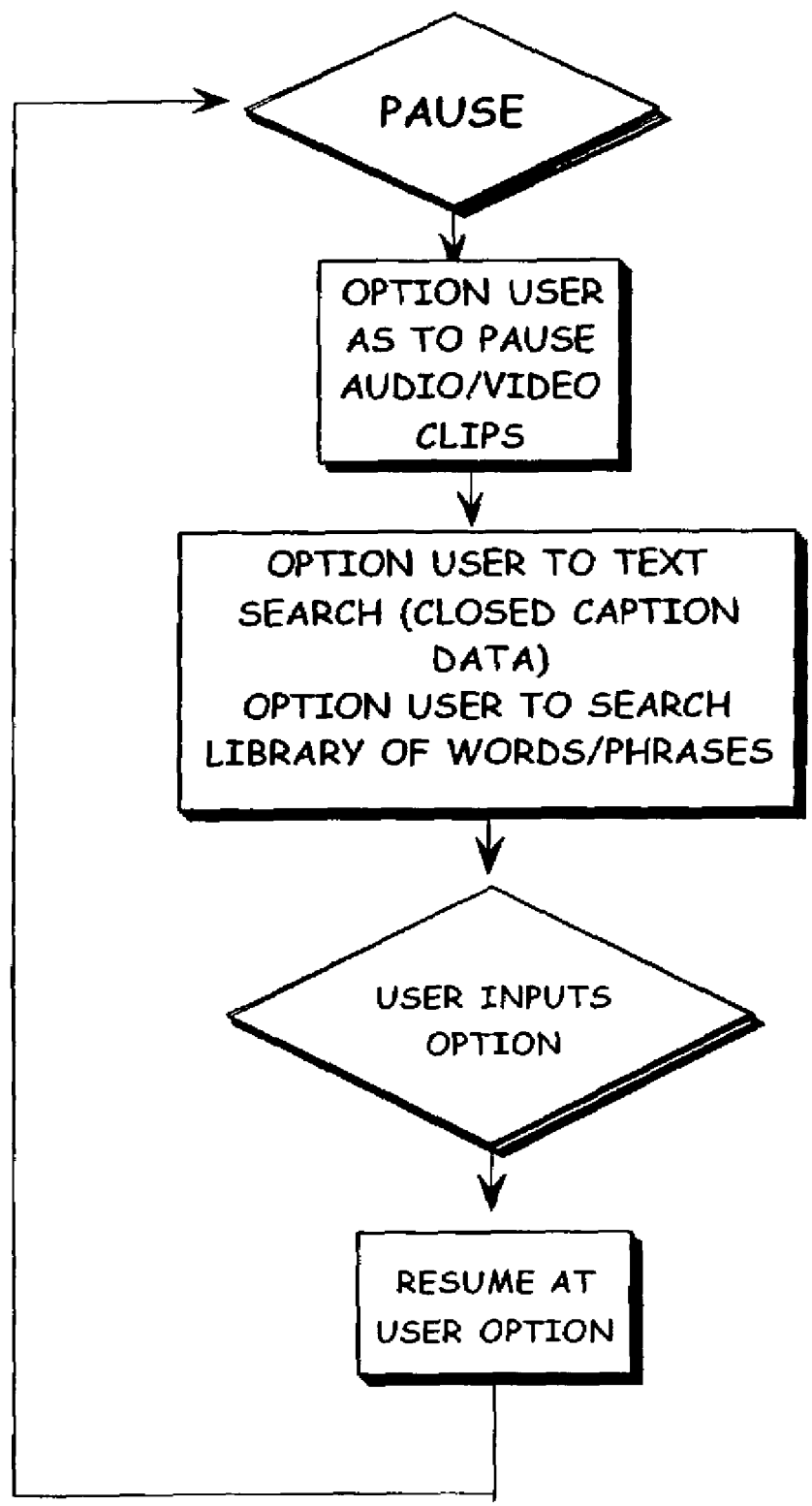
FIG. 12 is a flow chart of a method for searching data for corresponding text.

Referring generally to FIG. 12, a method for employing text searching is shown, such as may be implemented by the multimedia broadcast management system of FIG. 1 and the like. In the present embodiment a user may choose to search the closed caption information provided with a multimedia broadcast event to search for a key word such as "touch down" "score" or the like. In additional embodiments, the multimedia broadcast management system is provided with a library for commonly searched word and or phrases to expedite searching.

Figure 13:
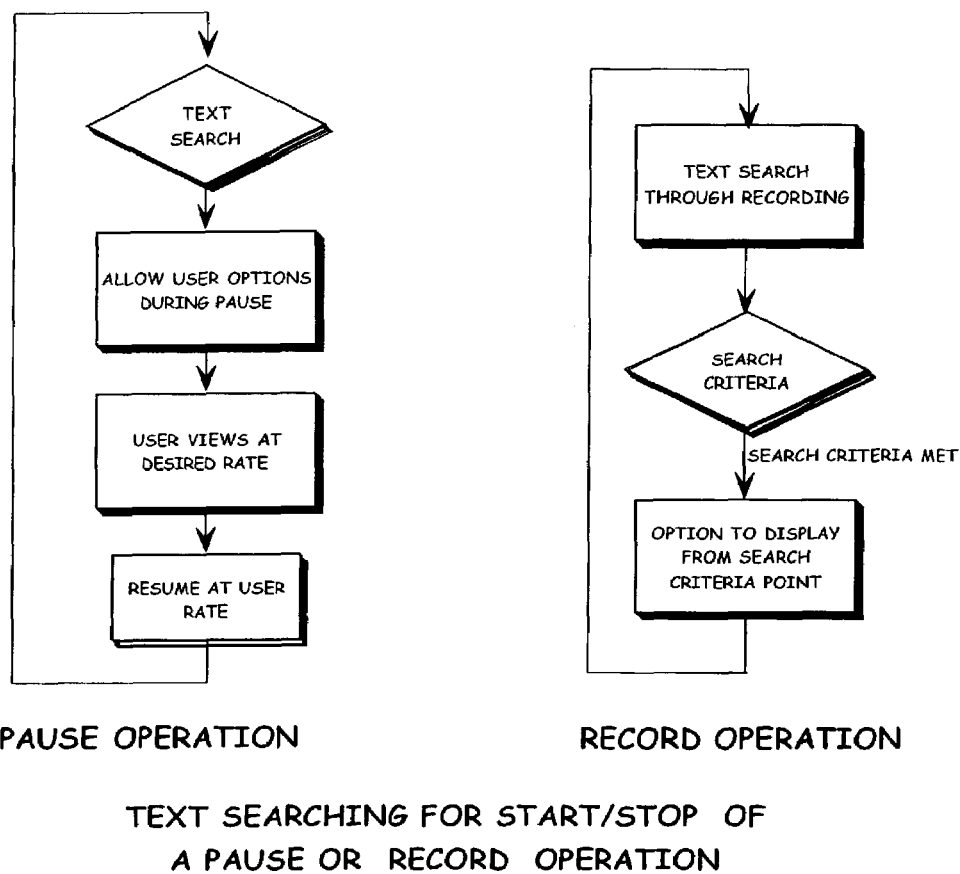
FIG. 13 is a flow chart of a method for optioning a user as to pause options and subsequent user experience options.

Referring generally to FIG. 13, a method for allowing a user to text search for locating the starting point/stopping point for during one of a pause operation and a record operation is discussed. The user may choose to search text to allow more efficient access to recording/pause operations, such as when implemented in a system of the present invention.

Figure 14:
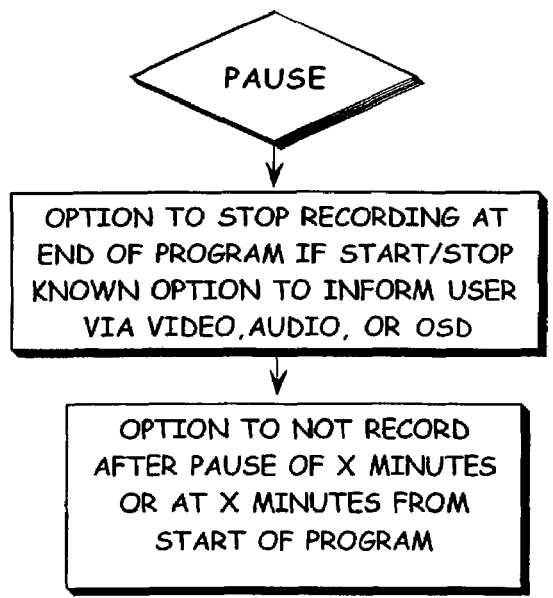
FIG. 14 is a flow chart of a method for optioning a pause stop/gap feature option.

Referring generally to FIG. 14, a method for allowing a user to option a pause stop/gap feature is shown. The present method may be implemented by a system of the present invention such as the multimedia broadcast management system of FIG. 1 and the like.

Figure 15:
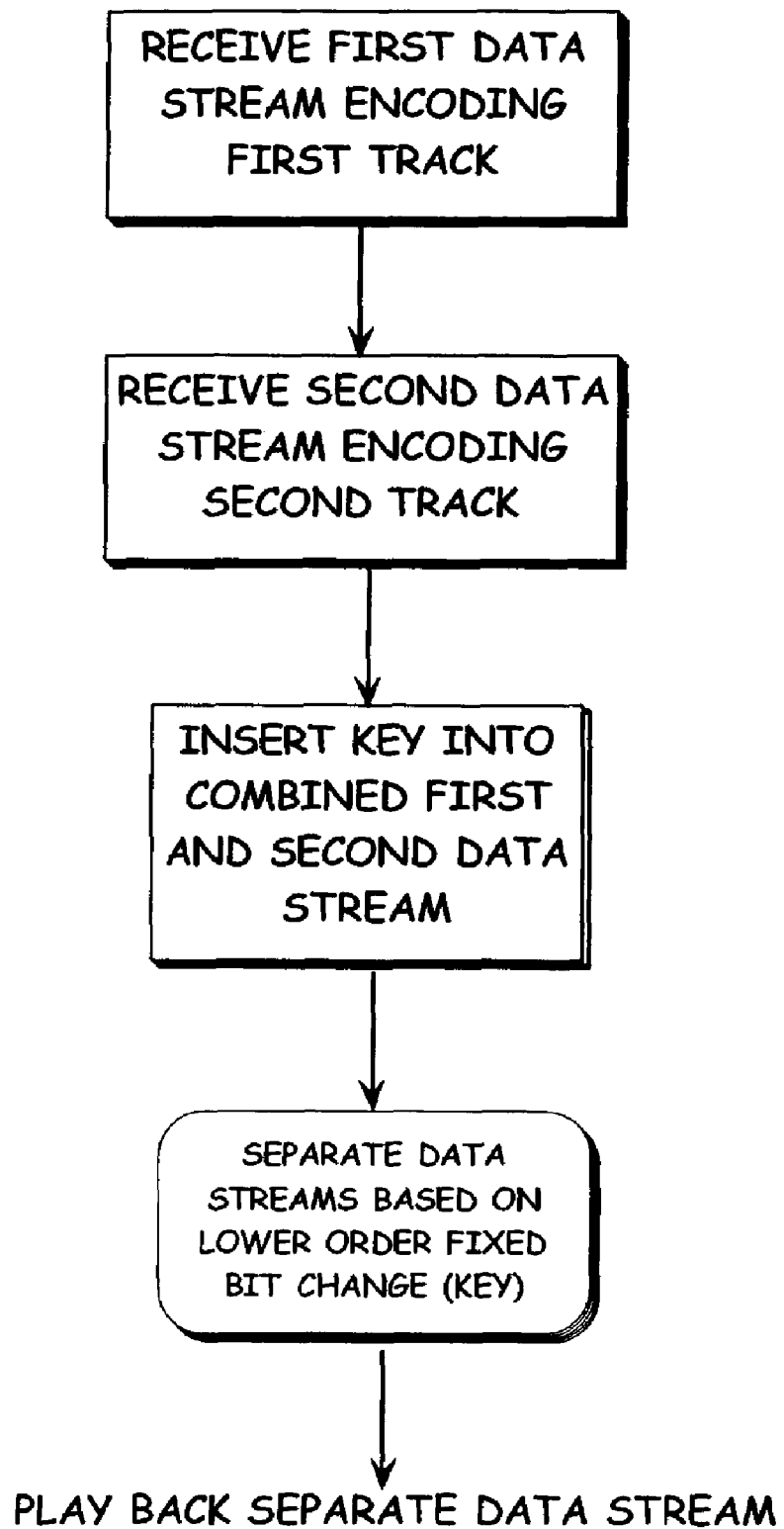
FIG. 15 is a flow chart of a method for identifying a media playback data stream.

Referring generally to FIG. 15, the system, method and software of the present invention may implement a user play program (UPP). UPP is a program of playback which is in the process of being generated. UPP software allows a user to access component data streams of multimedia broadcast presentations to vary multi-media experience. In other words, UPP software is capable of customizing decoupled media component portions into a customized output/playback data stream according to the user's desire. PVRs incorporating a UPP have the capacity to manipulate data streams individually to increase functionality. Implementing a UPP allows the user to manipulate a playback data stream to generate, manipulate, and search data streams, thus permitting customization of the multi-media experience. Those of ordinary skill in the art will appreciate that the UPP of the present embodiment may be utilized to manage data streams from multiple input sources to customize a playback data stream. For example, a user wishing to watch a football game may receive audio input from a satellite signal, a radio signal, and a internet audio feed. Multiple audio sources allow the user to match data streams from different sources to achieve a desired experience.

In further aspects, the UPP allows generation of a playback audio data stream which may be formed from multiple sources, such as from a left and right signal. Additionally, the audio mix timing and volume choices may be varied as well. Decoupling audio data streams from other media data streams permits fast-forwarding, searching, filtering, adding background, including special effects, swapping, multiplexing and the like. Special effects include manipulating the audio, such as by dropping words, shorten word intervals and the like. For example, when listening to a comedy program the laugh track can be filtered, the specific source selected or the audio searched. Individual audio streams, L and R can be individually accessed to allow L/R swapping, combine or overlay L/R audio and the like. For instance, when experiencing a program the user may search the audio data stream for a resumption indicator and then recommence experiencing the video and audio from that point. A resumption indicator may be a series of musical notes or the like. The UPP guide allows a user to set a filter level to remove, or lessen background noise in comparison to dialogue. A user may choose to create an audio data stream by recording comments for playback with the audio and/or video data streams forming a program.

UPP software configures a processor, such as included in a PVR, to decouple a data stream encoding a multimedia event into component data streams. For instance, a typical decoupled football game is formed of a background audio track, a narration track, a crowd noise track, a video stream, and a closed caption stream.

The UPP software receives a selection, from a user, of at least one media component for presentation. Because the UPP software is implemented contemporaneously on the playback/output data stream the user may manipulate the various component data streams to generate a customized experience. For example, the user may wish to experience the game without a narration/announcer track. In another example, the user may choose to replace the audio provided with a television sporting event with the audio from a secondary source, such as a radio program.

The UPP software then configures the processor to assemble a playback data stream encoding the selected media component data streams for presentation on an output device, such as a television or devices, such as a home theater system. Assembling a playback data stream may include adding background, including special effects, swapping, and multiplexing and the like for assemble the selected media component data stream for playback.

A user play program guide is a program of instructions which configures a processor, such as included in a PVR, to generate a electronic indicator of component data streams available for playback. The electronic indicator preferably is a video output display. For example an electronic indicator is a menu of available component data streams. The menu may consist of audio from a sporting event, video from the same sporting event, audio from a secondary source web cast and the like. In further aspects, an electronic indicator is a video overlay such as a pop-up bar which is displayed over the primary video output. The electronic indicator may also be displayed on a dedicated output device and the like.

The UPP guide configures the processor to permit the user to select from the available media component data streams, included in the electronic indicator, for contemporaneous playback. For example, a background audio track is reduced in comparison to a dialogue audio track.

Because multimedia data streams are decoupled, the UPP guide gives the user access to the individual component data stream to allow sampling, manipulation, combining data streams to provide a customized playback stream.

Figure 16:
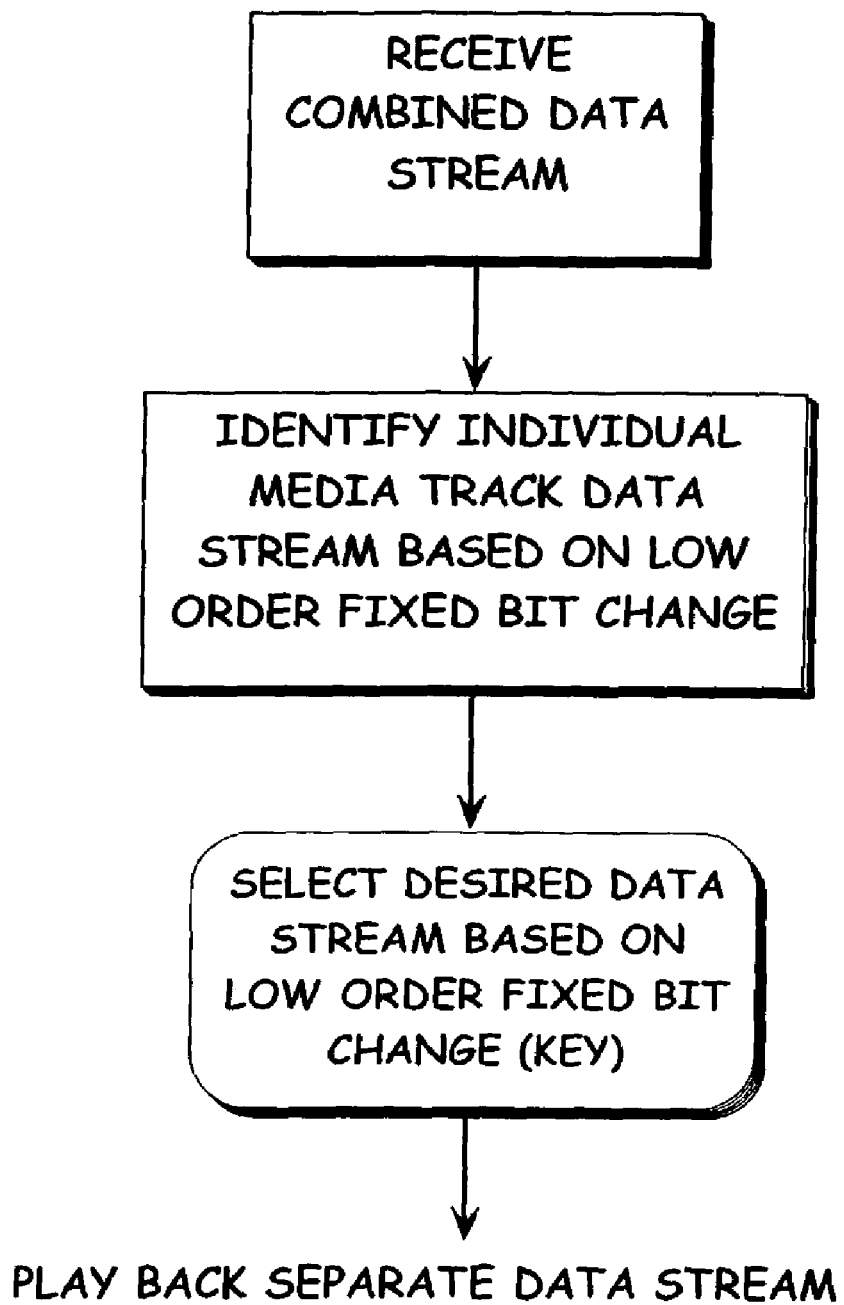
FIG. 16 is a flow chart of a method for customizing a media playback data stream.

Referring generally to FIG. 16, when experiencing an audio track a user, via the UPP guide, may mix data streams from multiple sources such as from a web broadcast or the like. The user may delay the source, through buffering; swap between audio provided with the video program; and an secondary audio source and the like.

For example, a user selects to view a basketball game with the crowd noise filtered to the same level as previous game. Thus, the UPP implements a capture pattern from a previously experienced event and applies it to the basketball game. By implementing the previous UPP capture pattern, the basketball game is presented according to the comparative function/audio level standards of the previous basketball game. In another example, the capture pattern of the previous game is correlated to a user profile so the parameters are automatically applied. Additionally, audio header profiling options may be utilized to remove narration, music and the like and change component audio levels, such as raise dialogue in comparison to background audio.

In other situations, UPP guides sets, or predefined parameters, may be obtained from third party sources, such as via a download, smart cards, or the like. A UPP guide set is a set of predefined parameters for controlling the user's multimedia experience. UPP guide set may include predefined parameters to filter, censor content, link content of a multimedia presentation and the like. For instance, religious organizations could provide UPP guide set for parent to censor/filter a multimedia event for obscene content.

Figure 18:
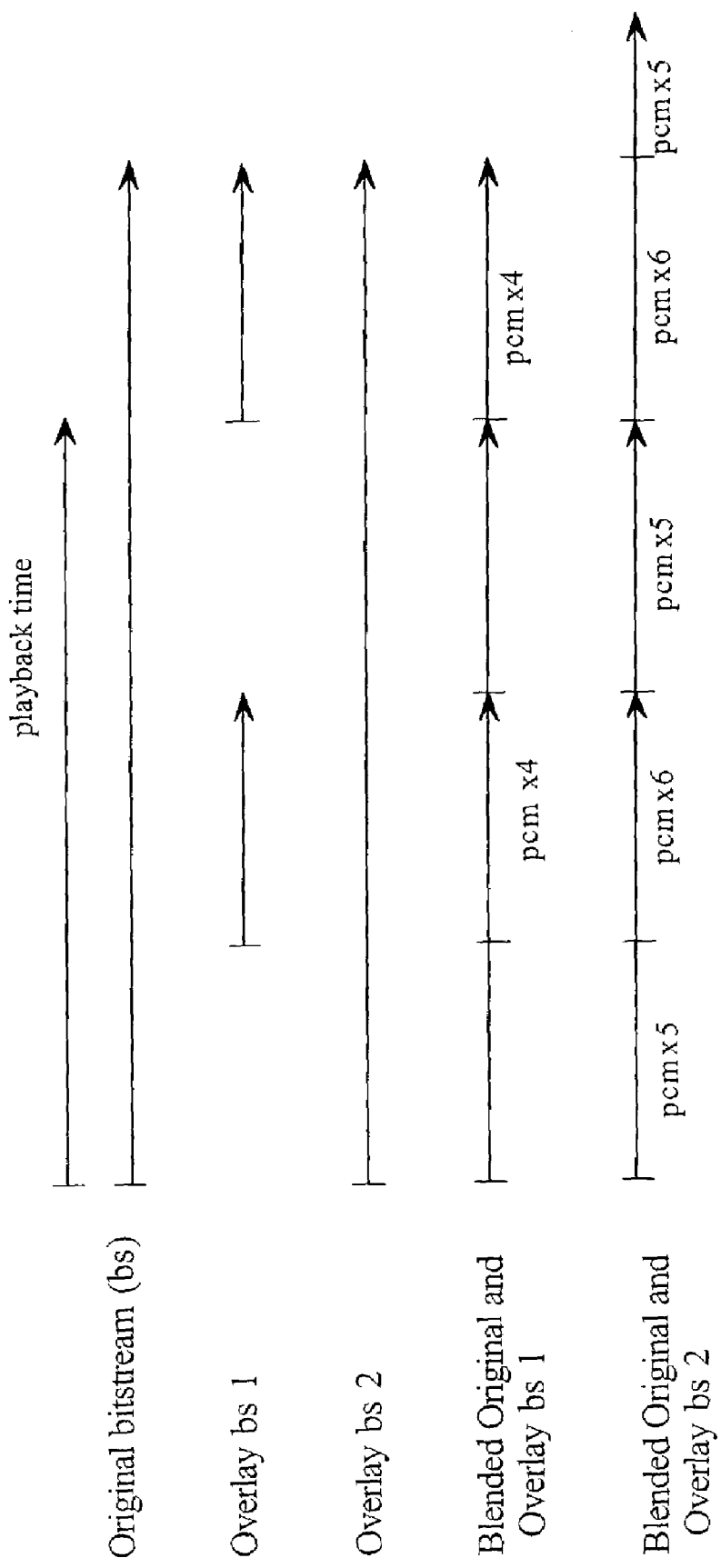
FIG. 18 is a graphical representation of the key example of FIG. 17.

Referring now to FIGS. 17 and 18, in a further aspect UPP software may employ infrequently use pulse coded modulation (PCM) audio code to add keys within audio data. For example, keys may be placed with sufficient value, so as not to be confused with the absence of audio; while sufficiently low so as not to interfere with audio, such as dialogue, e.g. commonly occurring words. Keys are utilized to identify audio track overlaying has occurred. Moreover, including keys allows a system to selectively remove overlays or the recorded track. During playback a register field will specify if the lower bits are a fixed PCM, to identify data stream overlays. Overlays may be an overall PCM amplitude increase or decrease in which hardware implementing the key adds or subtracts the PCM values from the stream value.

Referring to FIG. 17, in a first key example the original source code, overlay 1, overlay 2, and the corresponding blended overlays are discussed. In the blended original and overlay of 1 and 2 the original source is overlaid with two audio tracks, such as a laugh track and a narration track or the like. The blended original and overlay 1 may be the original audio track and for example, a narration track. The original source PCM is 15, 17, 18, 14, 24; while overlay 1 is 14, 13, 17, 17, 19 and the blended is 29, 31, 35, 31, 43. The "true" additive value of the original source and overlay 1 is 29, 30, 35, 31, 43. Thus, comparing the true value to the blended value the fixed bit change key "01" is included in the low order bit to identify the Overlay 1.

In blended original and Overlays 1 and 2 the original source PCM is 15, 17, 18, 14, 24; while overlay 1 is 14, 13, 17, 17, 19; overlay 2 is 17, 16, 14, 13, 12; and the blended Original source and Overlays 1 and 2 is 46, 36, 49, 46, 56. The "true" additive value of the Original source and overlays I and 2 is 46, 46, 49, 44, 55. Thus, comparing the true value to the blended value the key "10" is included to identify Overlays 1 and 2 utilizing the least significant, low order bits 44 and 55 are "rounded" or include a fixed bit change to achieve 46, 56; thus indicating the first and second overlay.

In blended original and Overlay 2 the original source PCM is 15, 17, 18, 14, 24; while overlay 2 is 17, 16, 14, 13, 12; and the blended Original source and Overlay 2 is 33, 33, 33, 27, 37. The "true" additive value of the Original source and overlay 2 is 32, 33, 32, 27, 36. Thus, comparing the true value to the blended value the fixed bit change key "11" is included to identify Overlay 2 utilizing the least significant, low order bits 32, 32, and 36 are "rounded" to achieve 33, 33 and 37; thus indicating the second overlay. Referring to FIG. 18, the PCM data streams of FIG. 17 are indicated graphically to show the combined data streams including the keys inserted into the data stream for identification.

In further embodiments, the UPP implementing a comparative function, such as implemented by a programmable logic device, e.g., programmable logic array, is implemented to monitor decoupled component data streams. For example, the UPP is utilized to monitor component data streams for duplication with previously stored data. For instance, a user may wish to automatically avoid duplicating the same television show, thus utilizing a software agent the UPP monitors the closed caption data stream for input data and compares the closed caption data to stored closed caption data via a software agent. The UPP correlates the input closed caption with previously captured closed caption to halt or prevent duplicate storage. In another example, the UPP indexes media streams forming the programming to permit indexing of shows, such as in a series. Alternatively, the user may be notified and allowed to revert to the previously captured video/audio program. Those of skill in the art will appreciate that indexing may implement based on priority, date recorded, last viewing, day of the week, and the like. The current example, index data is available via the UPP guide.

Additionally, an enhanced personal video recorder implementing the UPP guide of the present invention may be set to monitor an input channel so as to trigger recording of a certain program. For example, closed caption and/or audio data is monitored, on a designated channel, to record a television program, when triggered by audio/closed caption information included in the shows opening theme.

The comparative closed caption feature can be utilized to "mute" the audio stream so as to censor inappropriate or offensive language. For instance, the UPP of the present example compares the closed caption for inappropriate language prior to output of the data stream, such as through buffering; thus when corresponding audio occurs the audio stream may be muted or a non-offensive word substituted. Non-offending language may be stored as a library in an associated storage device and inserted in the audio data stream corresponding to the closed caption information. In further examples, audio recognition software is implemented to implement audio censoring.

Visual data may be managed as well in substantially the same manner as audio data. For example, multiple video data streams provide multiple videos, e.g. picture in picture (PIP), capability.

Video data, accessed through the UPP, may be compared to a pre-selected video clip data to allow fast forwarding to desired video segment. For example, storing an image of a movie studio logo allows the user to fast-forward through coming attractions or commercials at the beginning of a movie. Video data may be searched based on an overlaid station logo and the like. For instance, often television channels often include a station logo as part of the video data stream. Additionally, video censoring or filtering may utilize previous frames over offensive images, distorting images (e.g. opaquing an image), utilizing icons to cover images and the like based on offending audio data, closed caption data and the like.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

Advantageous examples of application of the UPP software, and method for customizing an audio playback data stream include: Left and Right audio mute; Left and right audio channel change and the like.

Advantageous examples of application of the UPP software, and method for customizing a video playback data stream include: video display including PIP variation, and size variation based on audio selected and/or volume; variation of video size between at least two video data streams based on an audio clip match within a delta audio clip segment; display video 1 or video 2, or both, including repeating the UPP playback data stream based on the last playback displaying video 1 and video 2.

Advantageous examples of system programming UPP user multi-media experience sets include: programming and sequencing left and right audio, and video 1 and video 2; multiplexing left and right audio, and video 1 and video 2 including adding timing, such as swapping left and right audio, separating left and right audio and the like; utilize a current program to program the UPP criteria, such as to apply filtering, indicating start and end points; filter previews/ header material based on a still video, such as studio symbol; layering filters based on at least two previous capture patterns/ UPP guide sets; skipping or reversing video/audio for a set increment, such as an automatic 1 minute skip for commercials, or a 1 minute audio mute; queuing audio based on a comparison of a delta audio clip segment, including prompting the user to listen or not, coupling left and right audio, and video 1 and video 2 to any one other of left and right audio, and video 1 and video 2; and including graphical representations to indicate UPP guide set selection or user selection.

Advantageous examples of UPP audio storage including keying overlay include: user selected initiation; initiation from a fixed time; storing from a timed pre or post clip; providing at least two matches for a play preview, such as by allowing time for user selection; from a stored data stream, e.g., a hard drive; selecting to fast forward audio or select one audio for output; display video 1 at accelerated pace for a set period; switch between video 1 and 2 based on still image determination; threshold matching for audio clip match; halting/recording to memory device based on audio clip match, such as audio indicator of news broadcast; searching/comparing audio data stream based on overlay; indexing scene jump, such as based on audio clip; e.g. jump scene to next intro music or the like.

Advantageous examples of UPP data stream analysis an manipulation include: mean square error analysis of the sum of the differences between bit streams, such as by comparing bit stream ranges for recordation of breakpoints and the like; storing audio clips based on user selects, from a fix data point, a timed point prior or after a current clip, from a match or a selected number of matches, from a recorded data stream, option to have audio at twice fast forward, or automatically select one audio, video 1 display with video at twice fast forward for a set time period, such as to locate a studio logo (still image), program audio clip based on expected audio with a program, from a fast forward point from a recorded channel, based on a match, e.g., tolerable delta and the like, upon a match, on a live channel (search at program pace), and the like.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an information handling system and, transmitted over a local area network or a wide area network, such as the Internet, when desired by the user.

It is believed that the method and software of the present invention and many of its attendant advantages will be understood by the forgoing description. It is also believed that it will be apparent that various changes may be made in the form, construction and arrangement of the components/steps thereof without departing from the scope and spirit of the invention or without sacrificing all of its material advantages. The form herein before described being merely an explanatory embodiment thereof. It is the intention of the following claims to encompass and include such changes.

What is claimed is:

1. A computer readable medium containing a user play program software system stored on a computer readable medium for manipulating a multimedia event, comprising:
 a program of instructions which configures a processor to
  decouple a data stream encoding a multimedia event into at least one media component data stream;
  select at least one of media component data stream included in the multimedia event for presentation;
  assemble a playback data stream which encodes selected media component data streams included in the data stream encoding a multimedia event;
  generate a field register for identifying at least one key, wherein the at least one key identifies a media track based on low order fixed bit change,
  wherein the program of instructions operates contemporaneously with the display of the playback data stream.

2. The system of claim 1, wherein the user play program software is provided as least one of firmware, a download, and encoded on removable media.

3. The system of claim 1, wherein the user play program software assembles the playback data stream based on a predefined standard.

4. The system of claim 3, wherein the predefined standard is at least one of a previous capture pattern and a user play program guide set.

5. The system of claim 1, wherein an individual media component data stream is at least one of a video, an overlay image, a closed caption information, an audio track, a laugh track, and a narration track.

6. The system of claim 1, wherein assembling includes at least one of adding background, including special effects, swapping, and multiplexing.

7. A method for identifying a media playback data stream, comprising:
 receiving a first data stream which encodes a first media track;
 receiving a second data stream encoding a second media track of the same type of media as the first media track; and
 inserting at least one key in a combined first and second data stream for identifying the second data stream from the first data stream, wherein the first data stream and the second data stream are pulse code modulation data, the key being a fixed bit change included in a low order bit of the combined first and second data stream.

8. The method of claim 7, wherein the first media track is an audio track.

9. The method of claim 7, further including the steps of:
 separating at least one of the first data stream and the second data stream based on the inserted key; and
 playing back a separated data stream, of the first and second data streams, independently.

10. A method for customizing a media playback data stream, comprising:
 receiving a combined data stream which encodes at least two media tracks of the same media type;

identifying an individual media track of the at least two media tracks based on a low order fixed bit change; and
selecting a desired data stream from the at least two media tracks of the combined data stream.

11. The method of claim 10, wherein the combined data stream is pulse code modulation data.

12. The method of claim 11, wherein identifying an individual media track includes implementing a register field to specify lower number bits as a fixed pulse code modulation value.

13. The method of claim 10, wherein the at least two media tracks are audio tracks.

14. The method of claim 10, further comprising the step of playing back the selected data stream independently.

* * * * *